(12) United States Patent
Desbois et al.

(10) Patent No.: US 9,109,085 B2
(45) Date of Patent: Aug. 18, 2015

(54) SEMI-AROMATIC, SEMI-CRYSTALLINE COPOLYAMIDES

(75) Inventors: Philippe Desbois, Edingen-Neckarhausen (DE); Andreas Wollny, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 507 days.

(21) Appl. No.: 13/514,445

(22) PCT Filed: Dec. 7, 2010

(86) PCT No.: PCT/EP2010/069013
§ 371 (c)(1),
(2), (4) Date: Jun. 7, 2012

(87) PCT Pub. No.: WO2011/069984
PCT Pub. Date: Jun. 16, 2011

(65) Prior Publication Data
US 2012/0245283 A1    Sep. 27, 2012

(30) Foreign Application Priority Data
Dec. 9, 2009   (EP) ................................. 09178480

(51) Int. Cl.
*C08G 69/26* (2006.01)
*C08L 77/06* (2006.01)

(52) U.S. Cl.
CPC ............... *C08G 69/265* (2013.01); *C08L 77/06* (2013.01); *C08G 69/26* (2013.01)

(58) Field of Classification Search
CPC ...... C08G 69/26; C08G 69/265; C08G 69/02; C08L 77/06
USPC .......................................... 524/607; 528/335
See application file for complete search history.

(56) References Cited

U.S. PATENT DOCUMENTS

| | | | |
|---|---|---|---|
| 3,948,862 A | 4/1976 | Iwasyk | |
| 4,148,846 A | 4/1979 | Owens et al. | |
| 4,264,762 A * | 4/1981 | Cordes et al. | 528/338 |
| 4,360,617 A | 11/1982 | Muller et al. | |
| 4,396,742 A | 8/1983 | Binsack et al. | |
| 4,537,949 A | 8/1985 | Schmidt et al. | |
| 4,714,718 A * | 12/1987 | Horn et al. | 521/134 |
| 4,771,109 A | 9/1988 | Eichenauer et al. | |
| 4,873,289 A | 10/1989 | Lindner et al. | |
| 4,882,381 A | 11/1989 | Wittmann et al. | |
| 4,990,567 A | 2/1991 | Isegawa et al. | |
| 5,010,135 A | 4/1991 | Eckel et al. | |
| 5,081,222 A | 1/1992 | Reimann et al. | |
| 5,688,901 A | 11/1997 | Fisch et al. | |
| 6,194,538 B1 | 2/2001 | Weiss et al. | |
| 6,699,960 B1 | 3/2004 | Ohlbach et al. | |
| 2006/0235191 A1 | 10/2006 | Deininger et al. | |
| 2009/0012229 A1 | 1/2009 | Desbois et al. | |
| 2009/0062452 A1 | 3/2009 | Harder et al. | |

FOREIGN PATENT DOCUMENTS

| | | |
|---|---|---|
| DE | 2702661 A1 | 8/1977 |
| DE | 3738876 A1 | 5/1988 |
| DE | 37 25 576 A1 | 2/1989 |
| DE | 38 00 603 A1 | 7/1989 |
| DE | 10313681 A1 | 10/2004 |
| EP | 50265 A1 | 4/1982 |
| EP | 129195 A2 | 12/1984 |
| EP | 0208187 A2 | 1/1987 |
| EP | 235 690 A2 | 9/1987 |
| EP | 299444 A2 | 1/1989 |
| EP | 0319290 A2 | 6/1989 |
| EP | 0325030 A2 | 7/1989 |
| EP | 0667367 A2 | 8/1995 |
| EP | 922065 A2 | 6/1999 |
| EP | 1198491 A1 | 4/2002 |
| EP | 1930373 A2 | 6/2008 |
| EP | 1994075 A2 | 11/2008 |
| EP | 2028231 A1 | 2/2009 |
| WO | WO-2007/23108 A1 | 3/2007 |

OTHER PUBLICATIONS

Ajroldi, et al., Journal of Applied Polymer Science, (1973) vol. 17, pp. 3187-3197 "Thermal Behavior of Nylon 6 Copolyamides Containing Aromatic Rings".
Ludewig, H, Faserforschung and Textilchemie, 1955, 6, 277.
Gaymans, et al., J. Polym. Sci., A, Chem. 1989, vol. 27, pp. 423-430 "Copolyamides of Nylon—4,6 and Nylon—4,T".
International Preliminary Report on Patentability PCT/EP2010/069013, Sep. 27, 2012.
International Search Report for PCT/EP2010/069013 mailed Apr. 6, 2011.

* cited by examiner

*Primary Examiner* — Michael Pepitone
(74) *Attorney, Agent, or Firm* — Drinker Biddle & Reath LLP

(57) ABSTRACT

Semiaromatic, semicrystalline copolyamide molding compositions, comprising
A) from 35 to 100% by weight of a copolyamide composed of
   $a_1$) from 35 to 69% by weight of units which derive from hexamethylenediamine and from an aromatic dicarboxylic acid having from 8 to 16 carbon atoms,
   $a_2$) from 31 to 65% by weight of units which derive from 3,3'-dimethyl-4,4'-diaminodicyclohexylmethane and from terephthalic acid,
   $a_3$) from 0 to 30% by weight of units of a semicrystalline polyamide different from $a_1$) and $a_2$),
B) from 0 to 65% by weight of further additives,
where the total of the percentages by weight of A) and B) is 100%.

16 Claims, No Drawings

SEMI-AROMATIC, SEMI-CRYSTALLINE COPOLYAMIDES

CROSS-REFERENCE TO RELATED APPLICATIONS

This application is a national stage application (under 35 U.S.C. §371) of PCT/EP2010/069013, filed Dec. 7, 2010, which claims benefit of European Application 09178480.1, filed Dec. 9, 2009.

The invention relates to semiaromatic, semicrystalline copolyamide molding compositions, comprising A) from 35 to 100% by weight of a copolyamide composed of $a_1$) from 35 to 69% by weight of units which derive from hexamethylenediamine and from an aromatic dicarboxylic acid having from 8 to 16 carbon atoms, $a_2$) from 31 to 65% by weight of units which derive from 3,3'-dimethyl-4,4'-diaminodicyclohexylmethane and from terephthalic acid, $a_3$) from 0 to 30% by weight of units of a semicrystalline polyamide different from $a_1$) and $a_2$), B) from 0 to 65% by weight of further additives, where the total of the percentages by weight of A) and B) is 100%.

The invention further relates to the use of the copolyamides of the invention for producing fibers, foils, and moldings of any type, and also to the resultant moldings.

High-temperature-resistant polyamides (HTPA) are mostly based on 6T (hexamethylenediamine, terephthalic acid) units. However, straight 6T has a very high melting point and cannot be processed without decomposition. Accordingly, copolymer systems have been developed that are intended to avoid this: e.g. EP-A 299 444 (PA6/6T, PA66/6T), EP-A 19 94 075 (PA6T/6I/MXD6), EP-A 667 367 (6T/6I/cycloaliphatic diamine).

The reduction of melting point with amount of copolyamide incorporated has been investigated systematically for the systems PA 6T/6, 6T/6I, 6T/66 and 4T/46 [G. Ajroldi, G. Stea, A. Mattiussi, F. Fumagalli, J. Appl. Poly. Sci. 1973, 17, 3187-3197, H. Ludewig, Faserforschung and Textilchemie 1955, 6, 277; Gaymans et al., J. Polym. Sci. A, Chem. 1989, 27, 423-430].

HTPAs having maximum glass transition temperature and high melting point (without decomposition) are particularly desirable for problem-free processing for many applications.

The present invention was therefore based on the object of providing semiaromatic, semicrystalline copolyamides which have high $T_G$ and high $T_m$ (without decomposition).

The copolyamide molding compositions defined in the introduction have accordingly been found. The subclaims give preferred embodiments.

The copolyamide molding compositions of the invention comprise, as component A), from 35 to 100% by weight, preferably from 35 to 95% by weight, of a copolyamide composed of $a_1$) from 35 to 69% by weight, preferably from 40 to 55% by weight, in particular from 40 to 52% by weight, of units which derive from hexamethylenediamine and from an aromatic dicarboxylic acid having from 8 to 16 carbon atoms.

Examples of suitable aromatic dicarboxylic acids are terephthalic acid, isophthalic acid, substituted terephthalic and isophthalic acids, e.g. 3-t-butylisophthalic acid, polynuclear dicarboxylic acids, e.g. 4,4'- and 3,3'-diphenyldicarboxylic acid, phthalic acid, 4,4'- and 3,3'-diphenylmethanedicarboxylic acid, diphenyl sulfone 4,4'- and 3,3'-dicarboxylic acid, 1,4- or 2,6-naphthalenedicarboxylic acid or phenoxyterephthalic acid, particular preference being given to terephthalic acid.

The amounts present of the units $a_2$) are from 31 to 65% by weight, preferably from 45 to 60% by weight, and in particular from 48 to 60% by weight in the copolyamide A). These derive from 3,3'-dimethyl-4,4'-diaminodicyclohexylmethane and terephthalic acid.

The stereoisomer constitution of the diamine used is preferably from 50 to 80% by weight of the trans-trans isomer, while the constitution of the remainder is made of cis-trans and cis-cis isomers and the proportion of the cis-cis isomer is preferably smaller than 10% by weight.

The copolyamides of the invention can comprise, as units $a_3$), from 0 to 30% by weight of units of a semicrystalline polyamide different from $a_1$) and $a_2$).

When units $a_3$) are present, the preferred resultant constitutions are as follows:

$a_1$) from 35 to 55% by weight, in particular from 40 to 50% by weight $a_2$) from 35 to 60% by weight, in particular from 35 to 45% by weight $a_3$) from 5 to 25% by weight, in particular from 10 to 22% by weight.

For units $a_3$) it is possible to use not only the aromatic carboxylic acids described above but also aliphatic dicarboxylic acids.

Preferred aliphatic dicarboxylic acids are those having linear or branched alkyl radicals having from 2 to 20 carbon atoms, preferably having from 4 to 16 carbon atoms, very particularly preferably having from 6 to 14 carbon atoms.

Dicarboxylic acids that can be used are those which have two carboxylic acid groups (carboxy groups) or derivatives thereof. Derivatives particularly used are $C_1$-$C_{10}$-alkyl, preferably methyl, ethyl, n-propyl, or isopropyl, mono- or diesters of abovementioned dicarboxylic acids, the corresponding dicarbonyl halides, in particular the dicarbonyl dichlorides, and also the corresponding dicarboxylic anhydrides. Examples of such compounds are ethanedioic acid (oxalic acid), propanedioic acid (malonic acid), butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid (brassylic acid), $C_{32}$ dimer fatty acid (product marketed by Cognis Corp., USA), the methyl ester thereof, examples being dimethyl ethanedioate, dimethyl propanedioate, dimethyl butanedioate, dimethyl pentanedioate, dimethyl hexanedioate, dimethyl heptanedioate, dimethyl octanedioate, dimethyl nonanedioate, dimethyl decanedioate, dimethyl undecanedioate, dimethylester dodecanedioate, dimethyl tridecanedioate, the dimethyl ester of $C_{32}$ dimer fatty acid, dichlorides thereof, examples being ethanedioyl dichloride, propanedioyl dichloride, butanedioyl dichloride, pentanedioyl dichloride, hexanedioyl dichloride, heptanedioyl dichloride, octanedioyl dichloride, nonanedioyl dichloride, decanedioyl dichloride, undecanedioyl dichloride, dodecanedioyl dichloride, tridecanedioyl dichloride, the dichloride of $C_{32}$ dimer fatty acid, and also the anhydrides thereof, examples being butanedicarboxylic acid and pentanedicarboxylic acid, preference being given here to tetradecanedioic acid (C14), pentadecanedioic acid (C15), hexadecanedioic acid (C16), heptadecanedioic acid (C17), octadecanedioic acid (C18), 1,4-cyclohexanedioic acid.

It is, of course, also possible to use mixtures of the above-mentioned dicarboxylic acids.

Other polyamide-forming monomers can derive from aliphatic or cycloaliphatic diamines having from 4 to 16 carbon atoms, or else from aminocarboxylic acids. Suitable monomers of this type that may be mentioned here are, as representatives of the diamines, 1,4-butanediamine, 1,5-pentanediamine, piperazine, 4,4'-diaminodicyclohexylmethane, 2,3-(4,4'-diaminodicyclohexyl)propane or 3,3'-dimethyl-4,4'-diaminodicyclohexylmethane, hexamethylenediamine, 1,8-diaminooctane, 1,9-diaminononane, 1,10-diaminodecane, 1,12-diaminododecane, 1,13-diaminotridecane, 2,2,4- or 2,4,4-trimethylhexamethylenediamine, xylylenediamines, and methylpentamethylenediamine, and ω-aminoundecanoic acid as representative of the aminocarboxylic acids.

The following list, which is not exhaustive, comprises the possible units $a_3$) mentioned for the purposes of the invention, and the monomers comprised.

AA/BB polymers
PA 46 tetramethylenediamine, adipic acid
PA 66 hexamethylenediamine, adipic acid (particularly preferred)
PA 69 hexamethylenediamine, azelaic acid
PA 610 hexamethylenediamine, sebacic acid
PA 612 hexamethylenediamine, decanedicarboxylic acid
PA 613 hexamethylenediamine, undecanedicarboxylic acid
PA 1212 1,12-dodecanediamine, decanedicarboxylic acid
PA 1313 1,13-diaminotridecane, undecanedicarboxylic acid
PA 6T hexamethylenediamine, terephthalic acid
PA MXD6 m-xylylenediamine, adipic acid
AA/BB polymers
PA 6I hexamethylenediamine, isophthalic acid
PA 6-3-T trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 diaminodicyclohexylmethane, laurinolactam
PA 6I/6T/PACM as PA 6I/6T+diaminodicyclohexylmethane
PA 12/MACMI laurinolactam, dimethyldiaminodicyclohexylmethane, isophthalic acid
PA 12/MACMT laurinolactam, dimethyldiaminodicyclohexylmethane, terephthalic acid
PA PDA-T phenylenediamine, terephthalic acid The polyamides A) can be produced by processes known per se (e.g. EP 129 195, U.S. Pat. No. 3,948,862). It is also possible to use the process described in WO 2007/23108, in which the corresponding dinitriles of the diacids are used as equivalents of the acids, or direct polymerization in the presence of water, for example as described in DE-A 10313681, EP-A 1198491 and EP 922065.

The polyamides of the invention are preferably produced in a continuous or batch hydrolytic polycondensation reaction between the corresponding diamines and free dicarboxylic acids from aqueous solution or from an aqueous solution of a water-soluble hypophosphite salt (from 0.05 to 0.5% by weight). The resultant prepolymer with intrinsic viscosity (IV) of from 40 to 120 ml/g (0.5% by weight in concentrated sulfuric acid, ISO 307) is subjected to a postcondensation process either in the solid phase or in the melt, in an extruder, until the IV achieved is at least 80 ml/g, preferably from 100 to 300 ml/g.

As an alternative, the copolyamide of the invention can be produced from a polyamide having units $a_1$) and from a polyamide having units $a_2$) via melting and transamidation in the melt, in particular in an extruder. The respective polyamides here are introduced separately and optionally catalytic additives and/or accelerators are added (examples being hypophosphite compounds, organophosphites, or organophosphonates). The resultant copolyamide has a single unitary glass transition temperature after the transamidation and copolyamide-formation process.

The glass transition temperature $T_G$ of the copolyamides A) is preferably above 135° C., particularly above 145° C., and in particular from 150 to 190° C.

The melting point $T_m$ is preferably below 330° C., in particular from 295 to 325° C. These parameters are usually measured by means of DSC (differential scanning calorimetry) according to ISO 11357-2, 3, and 7 (20 K/min, 2nd heating curve).

The quotient $T_G$ [Kelvin]/$T_m$[K] is preferably at least 0.71, in particular at least 0.72, and very particularly preferably 0.73.

The molding compositions of the invention can comprise, as component B), up to 70% by weight, preferably up to 50% by weight, of further additives.

Fibrous or particulate fillers that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, the amounts used of these being from 1 to 50% by weight, in particular from 5 to 40% by weight, preferably from 10 to 40% by weight.

Preferred fibrous fillers which may be mentioned are carbon fibers, aramid fibers and potassium titanate fibers, and particular preference is given to glass fibers in the form of E glass. These may be used as rovings or in the commercially available forms of chopped glass.

The fibrous fillers may have been surface-pretreated with a silane compound to improve compatibility with the thermoplastic.

Suitable silane compounds have the general formula:

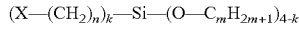

where the definitions of the substituents are as follows:
X NH$_2$—,

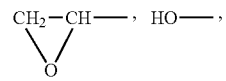

n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on B)).

Acicular mineral fillers are also suitable.

For the purposes of the invention, acicular mineral fillers are mineral fillers with strongly developed acicular character.

An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions of the invention can comprise, as further component B), from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol or n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use mixtures of various esters or amides, or of esters with amides in combination, in any desired mixing ratio.

The molding compositions of the invention can comprise, as further component B), from 0.05 to 3% by weight, preferably from 0.1 to 1.5% by weight, and in particular from 0.1 to 1% by weight, of a copper stabilizer, preferably of a Cu(I) halide, in particular in a mixture with an alkali metal halide, preferably KI, in particular in the ratio 1:4., or of a sterically hindered phenol, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of cuprous iodide to potassium iodide is between 1 and 11.5, preferably between 1 and 5.

Suitable polyamides for the concentrate are homopolyamides and copolyamides, in particular nylon-6 and nylon-6,6.

Suitable sterically hindered phenols B) are in principle all of the compounds having a phenolic structure and having at least one bulky group on the phenolic ring.

By way of example, compounds of the formula

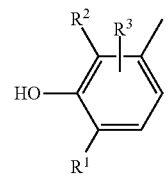

can preferably be considered, in which:

$R^1$ and $R^2$ are an alkyl group, a substituted alkyl group, or a substituted triazole group, where the radicals $R^1$ and $R^2$ can be identical or different, and $R^3$ is an alkyl group, a substituted alkyl group, an alkoxy group, or a substituted amino group.

Antioxidants of the type mentioned are described by way of example in DE-A 27 02 661 (U.S. Pat. No. 4,360,617).

Another group of preferred sterically hindered phenols is those derived from substituted benzenecarboxylic acids, in particular from substituted benzenepropionic acids.

Particularly preferred compounds from this class are compounds of the formula

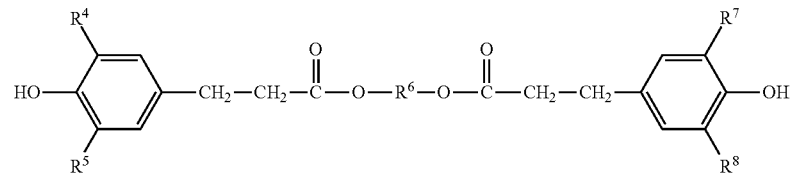

where $R^4$, $R^5$, $R^7$, and $R^8$, independently of one another, are $C_1$-$C_8$-alkyl groups which themselves may have been substituted (at least one of these being a bulky group), and $R^6$ is a divalent aliphatic radical which has from 1 to 10 carbon atoms and whose main chain may also have C—O bonds.

Preferred compounds corresponding to these formulae are

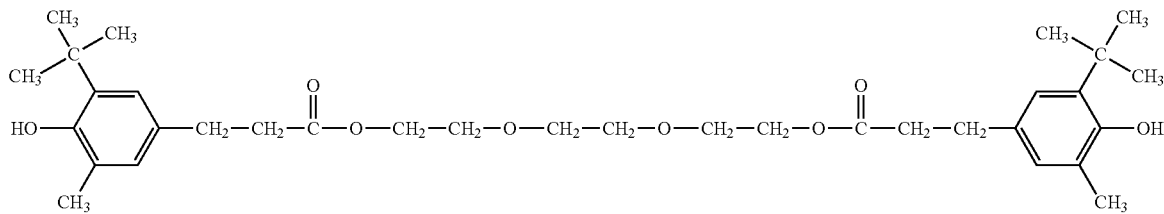

(Irganox® 245 from BASF SE)

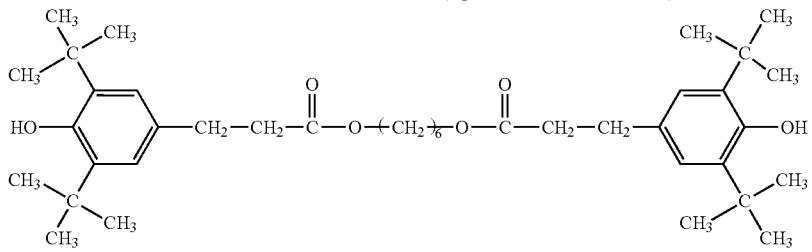

(Irganox® 259 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxy-benzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyppropionate], and also N,N'-hexamethylene-bis-3,5-di-tert-butyl-4-hydroxyhydrocinnamide (Irganox® 1098), and the product Irganox® 245 described above from BASF SE, which has particularly good suitability.

The amount comprised of the antioxidants B), which can be used individually or as a mixture, is from 0.05 up to 3% by weight, preferably from 0.1 to 1.5% by weight, in particular from 0.1 to 1% by weight, based on the total weight of the molding compositions A) to B).

In some instances, sterically hindered phenols having not more than one sterically hindered group in ortho-position with respect to the phenolic hydroxy group have proven particularly advantageous; in particular when assessing colorfastness on storage in diffuse light over prolonged periods.

The molding compositions of the invention can comprise, as component B), from 0.05 to 5% by weight, preferably from 0.1 to 2% by weight, and in particular from 0.25 to 1% by weight, of a nigrosine.

Nigrosines are generally a group of black or gray phenazine dyes (azine dyes) related to the indulines and taking various forms (water-soluble, oleosoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosines are obtained industrially via heating of nitrobenzene, aniline, and aniline hydrochloride with metallic iron and $FeCl_3$ (the name being derived from the Latin niger=black).

Component B) can be used in the form of free base or else in the form of salt (e.g. hydrochloride).

Further details concerning nigrosines can be found by way of example in the electronic encyclopedia Römpp Online, Version 2.8, Thieme-Verlag Stuttgart, 2006, keyword "Nigrosin".

Examples of other conventional additives B) are amounts of up to 25% by weight, preferably up to 20% by weight, of elastomeric polymers (also often termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, 1961), pages 392-406, and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I, II, III or IV

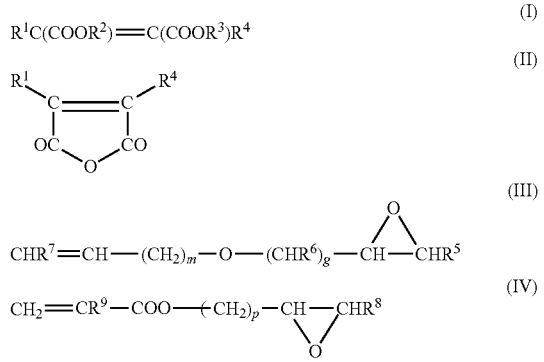

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising acid-anhydride groups, the remaining amount being (meth)acrylates.

Particular preference is given to copolymers composed of from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

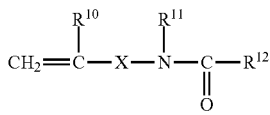

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl, $R^{12}$ is hydrogen, a $C_1$-$C_{10}$-alkyl group, a $C_6$-$C_{12}$-aryl group, or —$OR^{13}$, $R^{13}$ is a $C_1$-$C_8$-alkyl group or a $C_6$-$C_{12}$-aryl group, which can optionally have substitution by groups that comprise O or by groups that comprise N, X is a chemical bond, a $C_1$-$C_{10}$-alkylene group, or a $C_6$-$C_{12}$-arylene group, or

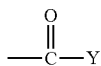

Y is O—Z or NH—Z, and

Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of cross-linking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

The thermoplastic molding compositions of the invention can comprise, as component B), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines, such as diphenylamines, various substituted representatives of these groups, and mixtures of these, in concentrations of up to 1% by weight, based on the weight of the thermoplastic molding compositions.

UV stabilizers that may be mentioned, the amounts of which used are generally up to 2% by weight, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also, with preference, talc.

The thermoplastic molding compositions of the invention can be produced by processes known per se, by mixing the starting components in conventional mixing apparatus, such as screw-based extruders, Brabender mixers, or Banbury mixers, and then extruding the same. The extrudate can be cooled and pelletized. It is also possible to premix individual components and then to add the remaining starting materials individually and/or likewise in the form of a mixture. The mixing temperatures are generally from 230 to 320° C.

In another preferred procedure, components B) can be mixed with a prepolymer and compounded and pelletized. The resultant pellets are then condensed in the solid phase under an inert gas, continuously or batchwise, at a temperature below the melting point of component A), until the desired viscosity has been reached.

The thermoplastic molding compositions of the invention feature good processability together with good mechanical properties, and also high $T_G$ coupled with high $T_m$, but without decomposition of the polymer during processing.

These materials are suitable for producing fibers, foils, and moldings of any type. Some examples are now mentioned: cylinder-head covers, motorcycle covers, intake pipes, charge-air-cooler caps, plug connectors, gearwheels, fan wheels, and cooling-water tanks.

Improved-flow polyamides can be used in the electrical and electronics sector to produce plugs, plug parts, plug connectors, membrane switches, printed circuit board modules, microelectronic components, coils, I/O plug connectors, plugs for printed circuit boards (PCBs), plugs for flexible integrated printed circuits (FPCs), plugs for flexible integrated circuits (FFCs), high-speed plug connections, terminal strips, connector plugs, device plugs, cable-harness components, circuit mounts, circuit-mount components, three-dimensionally-injection-molded circuit mounts, electrical connectors, and mechatronic components.

Possible uses in automobile interiors are for dashboards, steering-column switches, seat components, headrests, center consoles, gearbox components, and door modules, and possible uses in automobile exteriors are for door handles, exterior-mirror components, windshield-wiper components, windshield-wiper protective housings, grilles, roof rails, sunroof frames, engine covers, cylinder-head covers, intake pipes (in particular intake manifolds), windshield wipers, and also exterior bodywork components.

Possible uses of improved-flow polyamides in the kitchen and household sector are for production of components for kitchen devices, e.g. fryers, smoothing irons, knobs, and also applications in the garden and leisure sector, e.g. components for irrigation systems, or garden devices, and door handles.

EXAMPLES

Hexamethylenediamine (6), 3,3'-dimethyl-4,4'-diaminodicyclohexylmethane (L), and terephthalic acid (T), and also optionally hexamethylenediamine and adipic acid, were weighed in a test tube together with an aqueous solution of sodium hypophosphite monohydrate ("NHP"; 0.1% by weight). The tables below state the appropriate amounts used in the mixtures of the examples. The reaction mixture was introduced into an autoclave reactor and flushed 3 times, in each case with nitrogen at 3 bar. The autoclave was heated to ET=200° C. and held at this T for 1 h, and was then heated to an external temperature of 350° C., and a gauge pressure of 16 bar was maintained for a total of 2 hours via continuous depressurization. The autoclave was then depressurized to ambient pressure within a period of 60 minutes and the postcondensation reaction was carried out at the same temperature for 120 minutes under a stream of nitrogen. The system was cooled under pressure (P=10 bar) and then the dry product removed was comminuted.

DSC Measurement:

The DSC measurements were carried out in a Q-2000 from Waters GmbH.

The starting weight was about 8.5 mg and the heating and cooling rate was 20 K/min (2nd heating curve).

The measurements carried out on the specimens were based on ISO 11357-2, 3, and 7.

ΔH was determined as follows:

Calculation of area under melting curve (2nd heating curve)

| Ex. | Starting weight | | | | | PA 6T % by wt. | PA LT % by wt. | PA 66 % by wt. | Tg2 ° C. | Tm2 ° C. | ΔH2 J/g | Tg (K)/ Tm (K) |
| | Hexa-methylene-diamine g | Terephthalic acid g | L g | AH salt g | H₂O g | | | | | | | |
|---|---|---|---|---|---|---|---|---|---|---|---|---|
| comp1 | 7.58 | 7.48 | 0 | 0 | 14.95 | 100 | 0 | 0 | 140 | 371 | 140 | 0.64 |
| comp2 | 0 | 0 | 0 | 15 | 15 | 0 | 0 | 100 | 58 | 256 | 98 | 0.63 |
| comp3 | 0 | 6.15 | 8.82 | 0 | 14.97 | 0 | 100 | 0 | 262* | — | — | — |
| comp4 | 6.56 | 7.81 | 2.75 | 0 | 15.21 | 70 | 30 | 0 | 168 | 317/346 | 54 | 0.71 |
| comp5 | 2.83 | 6.81 | 5.87 | 0 | 14.58 | 32 | 68 | 0 | 208* | — | — | — |
| 1 | 3.68 | 7.14 | 5.29 | 0 | 14.79 | 41 | 59 | 0 | 183 | 321 | 2 | 0.78 |
| 2 | 4.6 | 7.48 | 4.45 | 0 | 14.91 | 51 | 49 | 0 | 185 | 307 | 14 | 0.79 |
| 3 | 3.8 | 6.31 | 3.7 | 1.52 | 15.2 | 46 | 44 | 11 | 153 | 301 | 34 | 0.74 |
| 4 | 9.18 | 15.3 | 6.12 | 3.06 | 15.3 | 40 | 38 | 21 | 137 | 297 | 37 | 0.72 |
| 5 | 4.21 | 6.31 | 3.24 | 1.5 | 15.05 | 50 | 39 | 11 | 150 | 308 | 41 | 0.73 |

*amorpous softening point

The invention claimed is:

1. A semiaromatic, semicrystalline copolyamide molding composition, comprising
   A) from 35 to 100% by weight of a copolyamide composed of
      $a_1$) from 35 to 55% by weight of units which derive from hexamethylenediamine and from an aromatic dicarboxylic acid having from 8 to 16 carbon atoms,
      $a_2$) from 31 to 60% by weight of units which derive from 3,3'-dimethyl-4,4'-diaminodicyclohexylmethane and from terephthalic acid,
      $a_3$) from 5 to 25% by weight of units which are composed of hexamethylenediamine and of adipic acid, and
   B) from 0 to 65% by weight of further additives,
   where the total of the percentages by weight of A) and B) does not exceed 100%.

2. The copolyamide molding composition according to claim 1, in which the $T_G$ (glass transition temperature) of the copolyamide A, measured by means of DSC according to ISO 11357-2, 3, and 7 is greater than 135° C.

3. The copolyamide molding composition according to claim 1, in which the melting point $T_m$ of the copolyamide A is below 330° C. (measured by means of DSC according to ISO 11357-2, 3, and 7).

4. The copolyamide molding composition according to claim 1, in which the quotient $T_G$ (K)/$T_m$ (K) of the copolyamide A is at least 0.71.

5. The copolyamide molding composition according to claim 1, comprising, as units $a_1$), hexamethylenediamine and terephthalic acid.

6. A molding obtained from the copolyamide molding compositions according to claim 1.

7. A molding composition, comprising
A) from 35 to 100% by weight of a copolyamide composed of
   $a_1$) from 35 to 55% by weight of units which derive from hexamethylenediamine and from an aromatic dicarboxylic acid selected from terephthalic acid, 4,4'-diphenyldicarboxyllic acid, 1,4'-naphthalenedicarboxyllic acid, 2,6'-naphthalenedicarboxyllic acid, or diphenyl sulfone 4,4'-dicarboxylic acid,
   $a_2$) from 31 to 60% by weight of units which derive from 3,3'-dimethyl-4,4'-diaminodicyclohexylmethane and from terephthalic acid,
   $a_3$) from 5 to 25% by weight of units which are composed of hexamethylenediamine and of adipic acid, and
B) from 0 to 65% by weight of further additives,
   where the molding composition is a semicrystalline copolyamide, and the total of the percentages by weight of A) and B) does not exceed 100%.

8. The copolyamide molding composition according to claim 7, comprising, as units $a_1$), hexamethylenediamine and terephthalic acid.

9. The copolyamide molding composition according to claim 7 with a $T_G$ (glass transition temperature) of the copolyamide A greater than 135° C., and a $T_m$ (melting point) of the copolyamide A is below 330° C., as measured by means of DSC according to ISO 11357-2, 3, and 7.

10. The copolyamide molding composition according to claim 9 with a quotient $T_G$ (K)/$T_m$ (K) of the copolyamide A of at least 0.71.

11. The copolyamide molding composition according to claim 8 with a $T_G$ of the copolyamide A in the range of from 137° C. to 185° C.

12. The copolyamide molding composition according to claim 8 with a $T_m$ of the copolyamide A in the range of from 297° C. to 321° C.

13. The copolyamide molding composition according to claim 8 with a ΔH of the copolyamide A in the range from 14 to 41 J/g.

14. The copolyamide molding composition according to claim 11 with a ΔH of the copolyamide A in the range from 14 to 41 J/g.

15. A molding-obtained from the copolyamide molding compositions according to claim 7.

16. A molding-obtained from the copolyamide molding compositions according to claim 8.

\* \* \* \* \*